UNITED STATES PATENT OFFICE.

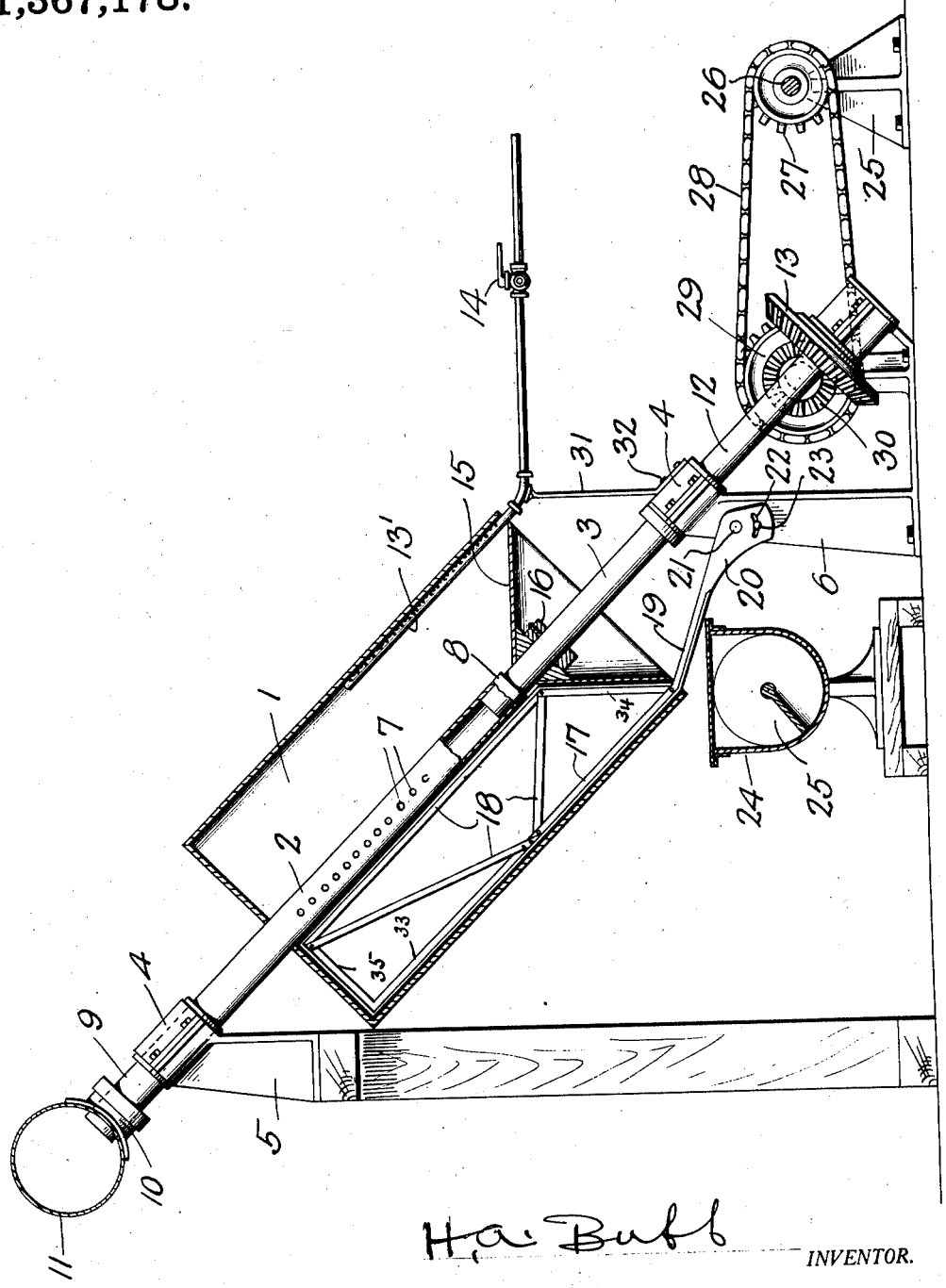

HARRY A. BUBB, OF WILLIAMSPORT, PENNSYLVANIA.

APPARATUS FOR THE MANUFACTURE OF CARBON BLACK.

1,367,178.

Specification of Letters Patent.   Patented Feb. 1, 1921.

Application filed May 8, 1920. Serial No. 379,905.

*To all whom it may concern:*

Be it known that I, HARRY A. BUBB, a citizen of the United States of America, residing at Williamsport, in the county of Lycoming and State of Pennsylvania, have invented certain new and useful Improvements in Apparatus for the Manufacture of Carbon Black, of which the following is a specification.

My invention relates to improvements in apparatus for the manufacture or production of carbon black, the principal object of the invention being to provide a device which will serve to effectually collect all products of carbon from gas, and also, to use such other elements in the gas, by combination with other gases or liquids, for various purposes, hence effecting a material saving upon part of a user.

It is also an object of the invention to provide the device with a novel form of means for collecting the carbon black formed therein and permitting the gases generated during such operation to be conducted from the same into suitable washing apparatus.

Yet another object of my invention is to provide the device with a novel form of scraper, the same being arranged in the cylindrical carbon black collecting means in a manner such as to insure its effectual engagement with all portions thereof which may carry the desired product and to remove such matter from said means in order that it can be discharged from the device into suitable conveying means.

Other objects will be in part obvious and in part pointed out hereinafter.

In order that the invention and the mode of application thereof may be readily understood by persons skilled in the art, I have in the accompanying drawings and in the detailed following description based thereon, set out one embodiment of the same.

In these drawings there is shown a vertical longitudinal section through the device.

Having more particular reference to the drawings in connection with which like reference characters will designate corresponding parts throughout, the improved device comprises a cylindrical body or barrel 1, mounted for rotation upon shafting consisting of sections 2 and 3 journaled in suitable bearings 4 supported upon pillars 5 and 6, it being noted in this connection that the pillars are of different heights and by consequence, serve to provide a diagonal or inclined support for the barrel 1. The section 2 is hollow and formed with a series of openings or ports 7 for a portion of its length, namely, that portion of the same within the barrel, while the adjacent end of the section 3 is engaged in the corresponding end of said section 2 and preferably brazed thereto as at 8, in order that a firm and positive jointure between the several sections will be insured. Also, it is to be noted, that the upper end of the section 2 is extended beyond the particular bearing 4 therefor, as indicated at 9, and is engaged, by way of a suitable gland 10, with a collector flue 11, which in turn, has communicaton with some form of washing apparatus, not shown, whereas the lower end of the section 3 is extended from its respective bearing 4 as at 12, and carries a bevel gear 13 thereon, the purpose of which will be presently described.

To secure the barrel 1 in a fixed position with relation to the shafting, I may and preferably do braze or otherwise join the same to the hollow section 2.

Extending into the barrel 1 is a gas burner 13′ carried on a supply pipe in which a control valve 14 is interposed for an obvious purpose. This burner comprises an elongated nozzle portion which is disposed diagonally with relation to the basal part thereof and arranged in parallel relation with respect to the inner surface of the barrel 1 so that the flame therefrom may be positively directed onto the lower half thereof, the upper or remaining half collecting the carbon that is usually wasted.

A hood 15, substantially frusto-conical in shape, is engaged in the lower open end of the barrel 1 and is secured in position with respect thereto through the medium of an adjustable collar 16 having clamping engagement with the section 3 of the shafting. This hood 15 serves to close the lower end of the barrel to the greatest possible extent, leaving only a slight annular way between the same and the adjacent portion of the barrel end, through which the burner 13′ and a scraper, hereinafter described, extend. By this arrangement of the hood it will be appreciated that the passage of air into the barrel will be extremely limited and in consequence will not interfere with the functioning of the burner or the collection of the carbon black on the inner surfaces of the barrel.

To remove the collected carbon from the inner surfaces of the barrel 1, I preferably employ a form of scraper such as indicated in its entirety by the numeral 17, consisting of a metal strip 33 which extends longitudinally of the inner side of the barrel, an angular strip 34 on its lower end which is parallel with and engages the inner surface of the hood 15, and a substantially right-angular strip 35 on its upper end which is parallel with and engages the partially closed upper end of the barrel, the scraper being braced by trusses 18 in order that it will be rendered as nearly rigid as is possible. The longitudinal strip of the scraper is formed with an extension 19, disposed at right angles thereto and carrying an enlarged part 20 on its outer end, which in turn is pivoted to a portion of the pillar 6, as at 21. Also, an arcuate slot 22 is formed in the part 20 and receives therethrough a clamping screw 23, whereby the scraper may be fixedly secured in an adjusted position with relation to the inner surfaces of the barrel and the hood 15, such adjustment being necessary to compensate for changes such as may be caused by expansion and contraction.

Positioned directly below the partially open lower end of the barrel 1 is a conveyer trough 24 having a screw 25 therein adapted to receive the carbon removed from the inner surfaces of the barrel by the scraper 17 and dropping therefrom by reason of the inclined mounting of said barrel.

As means for imparting rotary motion to the barrel 1, a driven shaft 26 is supported in bearings 25 in proximity to the lower end 12 of the section 3 and carries a sprocket wheel 27 on one end thereof, about which a chain 28 passes into engagement with a second sprocket wheel 29 mounted on a counter shaft also supported in suitable bearings, whereby the bevel gear 30 on the opposite end of said counter shaft will be rotated and in consequence, transmit rotary motion to the shafting supporting the barrel through the gear 13, hereinbefore described.

If desired the elbow portion of the burner supply pipe may be supported upon a bracket 31 which in turn is secured to the upper side of the adjacent bearing 4 as at 32.

The operation of my improved device may be reviewed as follows:

The barrel with the hood 15 is rotated through the power transmitting gearing herein described, whereupon the gas flowing from the burner 13' is ignited, the flame ensuing therefrom coming directly in contact with the adjacent surface of the rotating barrel, and as before stated, causing carbon to be deposited upon the upper surface of the barrel. Of course, carbon may collect upon any portions of the inner surfaces of the barrel or the hood 15 therefore and this carbon is effectually removed therefrom by means of the scraper 17, which has the various strips or blades from which it is constructed, engaging the adjacent portions of the barrel. The removed carbon is, by reason of the inclined mounting of the barrel, caused to drop therefrom by way of the annular opening in the lower end of the same into the screw conveyer from whence it may be conveyed to any desired point, such as conditions or preference may dictate. The gases generated by the functioning of the burner 13' will be permitted to enter the hollow section of shafting 2 by way of the ports 7 therein and conducted therefrom into the flue 11 for ultimate discharge into a form of washing apparatus or for admixture with other gases or liquids for various purposes.

It is to be understood that a plurality of burners may be employed in connection with the barrel, the same being arranged to direct their flames onto the inner surfaces of such barrel at different points. The barrel is rotated at a slow speed, and by consequence, there will be a greater or increased amount of carbon deposited on the same, hence, increasing the carbon output of the device.

Manifestly, the construction shown is capable of considerable modification and such modification as is within the scope of my claims I consider within the spirit of my invention.

What I claim is:

1. Apparatus for making carbon black, comprising a rotatable barrel, a burner arranged within the barrel adjacent one portion thereof, a hood engaged in one end of the barrel, and a scraper extending into said barrel for engaging the inner surfaces thereof and removing carbon therefrom.

2. Apparatus for making carbon black, comprising an inclined rotatable barrel, a burner within the barrel adjacent one portion thereof, a frusto-conical hood engaged in the lower end of the barrel, and means in said barrel engaging the inner surfaces of the same for removing carbon therefrom during its rotation.

3. Apparatus for making carbon black, comprising an inclined rotatable barrel having a closed upper end and an open lower end, a burner within the barrel adjacent one portion thereof, a frusto-conical hood engaged in the open lower end of the barrel for partially closing the same, and means extending into said barrel engaging the inner surfaces of the same for removing carbon therefrom.

4. Apparatus for making carbon black, comprising an inclined rotatable barrel, shafting for supporting and rotating said barrel, one portion of which is hollow and formed with a series of ports, a flue communicating with the hollow shafting, a burner within the barrel adjacent one portion thereof, and a scraper in the barrel engaging the inner surfaces of the same for removing carbon therefrom.

5. Apparatus for making carbon black, comprising an inclined rotatable barrel, shafting for supporting and imparting rotary motion to the barrel, the lower end of said barrel being open, said shafting having a hollow upper portion formed with a plurality of ports, a flue communicating with the hollow upper portion, a hood engaged in the open lower end of the barrel, and scraping means in and engaging the inner surfaces of the barrel and hood for removing carbon therefrom.

6. Apparatus for making carbon black, comprising an inclined rotatable barrel, shafting for supporting the same, a burner within the barrel adjacent one portion thereof, the lower end of said barrel being open, a hood engaged in the open end of the barrel for partially closing the same, scraping means in said barrel engaging the inner surfaces of the same and the hood for removing carbon therefrom, and conveying means positioned in proximity to the partially closed lower end of the barrel for receiving the collected carbon from the barrel.

7. Apparatus for making carbon black, comprising an inclined rotatable barrel having a closed upper end and an open lower end, a burner within the barrel adjacent one portion thereof, a frusto-conical hood engaged in the open lower end of the barrel for partially closing the same, and means extending into said barrel engaging the inner periphery and closed upper end of the barrel and the inner face of the hood for removing carbon therefrom.

In testimony whereof I affix my signature in presence of two witnesses.

HARRY A. BUBB.

Witnesses:
BURROUS B. DANLEY,
WILFRED M. DANLEY.